(12) United States Patent
Kim

(10) Patent No.: US 9,586,164 B2
(45) Date of Patent: Mar. 7, 2017

(54) PARTICULATE SEPARATOR

(71) Applicant: Caterpillar Inc., Peoria, IL (US)

(72) Inventor: Hoisan Kim, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 253 days.

(21) Appl. No.: 14/451,821

(22) Filed: Aug. 5, 2014

(65) Prior Publication Data

US 2016/0038867 A1  Feb. 11, 2016

(51) Int. Cl.
| | | |
|---|---|---|
| *B01D 47/00* | (2006.01) | |
| *B01D 45/16* | (2006.01) | |
| *B01D 53/24* | (2006.01) | |
| *B04C 3/06* | (2006.01) | |
| *B01D 45/12* | (2006.01) | |
| *B01D 17/02* | (2006.01) | |
| *B01D 19/00* | (2006.01) | |
| *B01D 53/86* | (2006.01) | |
| *B04C 9/00* | (2006.01) | |

(52) U.S. Cl.
CPC ......... *B01D 45/16* (2013.01); *B01D 17/0217* (2013.01); *B01D 19/0057* (2013.01); *B01D 45/12* (2013.01); *B01D 53/24* (2013.01); *B01D 53/86* (2013.01); *B04C 3/06* (2013.01); *B04C 2009/002* (2013.01)

(58) Field of Classification Search
CPC ........ B01D 45/16; B01D 46/16; B01D 53/24; B01D 45/12; B01D 17/0217; B01D 19/0057; B01D 53/86; B04C 3/06; B04C 2009/002
See application file for complete search history.

(56) References Cited

U.S. PATENT DOCUMENTS

| | | | | |
|---|---|---|---|---|
| 3,751,907 A | | 8/1973 | Anderson | |
| 4,231,763 A | * | 11/1980 | Baisden | B01D 45/16 422/177 |
| 4,268,277 A | * | 5/1981 | Rooker | B01D 45/12 55/347 |
| 4,278,550 A | * | 7/1981 | Watts | B01D 17/0217 210/104 |
| 4,723,972 A | * | 2/1988 | Leach | B01D 53/24 55/345 |

(Continued)

FOREIGN PATENT DOCUMENTS

| | | |
|---|---|---|
| CN | 102671469 | 9/2012 |
| CN | 202643660 | 1/2013 |

(Continued)

*Primary Examiner* — Dung H Bui
(74) *Attorney, Agent, or Firm* — John P. Wappel; Joell R. Hibshman, II

(57) ABSTRACT

A particulate separator for a gaseous fluid is provided. The particulate separator includes a sealable collection container defining a collection volume therein. The particulate separator also includes a gaseous fluid conduit provided through the sealable collection container. The gaseous fluid conduit defines an inner channel therein. The gaseous fluid conduit includes an inlet and an outlet. The gaseous fluid conduit also includes an arcuate segment provided between the inlet and the outlet. The arcuate segment includes a plurality of slits formed therein. The plurality of slits is configured to provide fluid communication between the collection volume and the inner channel of the gaseous fluid conduit.

15 Claims, 4 Drawing Sheets

(56) References Cited

U.S. PATENT DOCUMENTS

| | | | |
|---|---|---|---|
| 5,008,014 A * | 4/1991 | Lloyd | B01D 17/0214 |
| | | | 209/725 |
| 5,120,335 A | 6/1992 | Gorlich et al. | |
| 5,665,130 A * | 9/1997 | Nielsen | B01D 45/12 |
| | | | 208/161 |
| 5,963,611 A * | 10/1999 | Narabayashi | B01D 53/24 |
| | | | 376/371 |
| 6,022,474 A * | 2/2000 | MacKelvie | B01D 29/356 |
| | | | 210/170.01 |
| 6,981,995 B2 * | 1/2006 | Lombana | B01D 45/12 |
| | | | 55/452 |
| 7,381,235 B2 | 6/2008 | Koene et al. | |
| 2004/0060867 A1 * | 4/2004 | Kriksunov | B01D 67/0058 |
| | | | 210/650 |
| 2004/0093894 A1 * | 5/2004 | Kuhn | B01D 45/12 |
| | | | 62/512 |
| 2008/0156301 A1 | 7/2008 | Rockwell et al. | |
| 2011/0076754 A1 * | 3/2011 | Frey | B01D 21/0087 |
| | | | 435/283.1 |
| 2012/0118806 A1 * | 5/2012 | Steinecker | B01D 15/206 |
| | | | 210/198.2 |
| 2012/0168361 A1 * | 7/2012 | Motakef | B01D 46/0046 |
| | | | 210/137 |
| 2013/0152523 A1 * | 6/2013 | Sun | B01D 45/16 |
| | | | 55/419 |
| 2013/0206667 A1 * | 8/2013 | Steinecker | G01N 30/6052 |
| | | | 210/198.2 |

FOREIGN PATENT DOCUMENTS

| | | |
|---|---|---|
| CN | 202962136 | 6/2013 |
| DE | 10129098 | 1/2003 |
| JP | 2007107399 | 4/2007 |

\* cited by examiner

PARTICULATE SEPARATOR

TECHNICAL FIELD

The present disclosure relates to a particulate separator, and more particularly to a particulate separator for use with a gaseous fluid source.

BACKGROUND

Use of gaseous fuels, such as, natural gas, may be more in demand over the use of other hydrocarbon fuels in internal combustion (IC) engines. Gaseous fuels may be comparatively less expensive than the hydrocarbon fuels, and may burn relatively cleaner during operation. Cleaner burning of the gaseous fuels result in a reduced amount of combustion byproducts, such as, carbon monoxide, oxides of nitrogen ($NO_x$), and unburned hydrocarbons.

However, sometimes, the gaseous fuel flowing through various parts of the engine system may include particulate contaminants therein. The gaseous fuel containing the particulate contaminants may flow towards and sometimes even enter into various components of the engine system positioned downstream of a gaseous fuel tank. This may damage or lead to failure of the respective components of the engine system.

U.S. Pat. No. 5,120,335 describes a separator to separate products finely ground in a mill from a gas current consists of a housing which can be attached to the mill discharge site, having a tubular cylindrical insert which extends into the housing. The gas current is led into this tube and returned along its outer side. By sharply deflecting the gas current at the outlet of the tube, the product is separated and collected. In order to improve the efficiency of separation, the insert is designed so as to be formed by an inner tube and an outer tube, which form an annular space which serves to return the gas. A plate shapes the annular space as a spiral flow channel. There are slits in the outer tube located at the height of the bottom of the flow channel formed by the plate.

SUMMARY OF THE DISCLOSURE

In one aspect of the present disclosure, a particulate separator for a gaseous fluid is disclosed. The particulate separator includes a sealable collection container defining a collection volume therein. The particulate separator also includes a gaseous fluid conduit provided through the sealable collection container. The gaseous fluid conduit defines an inner channel therein. The gaseous fluid conduit includes an inlet and an outlet. The gaseous fluid conduit also includes an arcuate segment provided between the inlet and the outlet. The arcuate segment includes a plurality of slits formed therein. The plurality of slits is configured to provide fluid communication between the collection volume and the inner channel of the gaseous fluid conduit.

In another aspect of the present disclosure, a gaseous fuel system is disclosed. The gaseous fuel system includes a gaseous fuel source. The gaseous fuel system also includes a gaseous fuel rail. The gaseous fuel system further includes a particulate separator provided in fluid communication with the gaseous fuel source and the gaseous fuel rail. The particulate separator includes a sealable collection container defining a collection volume therein. The particulate separator also includes a gaseous fuel conduit provided through the sealable collection container. The gaseous fuel conduit defines an inner channel therein. The gaseous fuel conduit includes an inlet and an outlet. The gaseous fuel conduit also includes an arcuate segment provided between the inlet and the outlet. The arcuate segment includes a plurality of slits formed therein. The plurality of slits is configured to provide fluid communication between the collection volume and the inner channel of the gaseous fuel conduit.

In yet another aspect of the present disclosure, an engine system is disclosed. The engine system includes a fuel injector. The engine system also includes a gaseous fuel source. The engine system further includes a gaseous fuel rail. The engine system includes a particulate separator provided in fluid communication with the gaseous fuel source and the gaseous fuel rail. The particulate separator includes a sealable collection container defining a collection volume therein. The particulate separator also includes a gaseous fuel conduit provided through the sealable collection container. The gaseous fuel conduit defines an inner channel therein. The gaseous fuel conduit includes an inlet and an outlet. The gaseous fuel conduit also includes an arcuate segment provided between the inlet and the outlet. The arcuate segment includes a plurality of slits formed therein. The plurality of slits is configured to provide fluid communication between the collection volume and the inner channel of the gaseous fuel conduit.

Other features and aspects of this disclosure will be apparent from the following description and the accompanying drawings.

DETAILED DESCRIPTION

Figure 1:
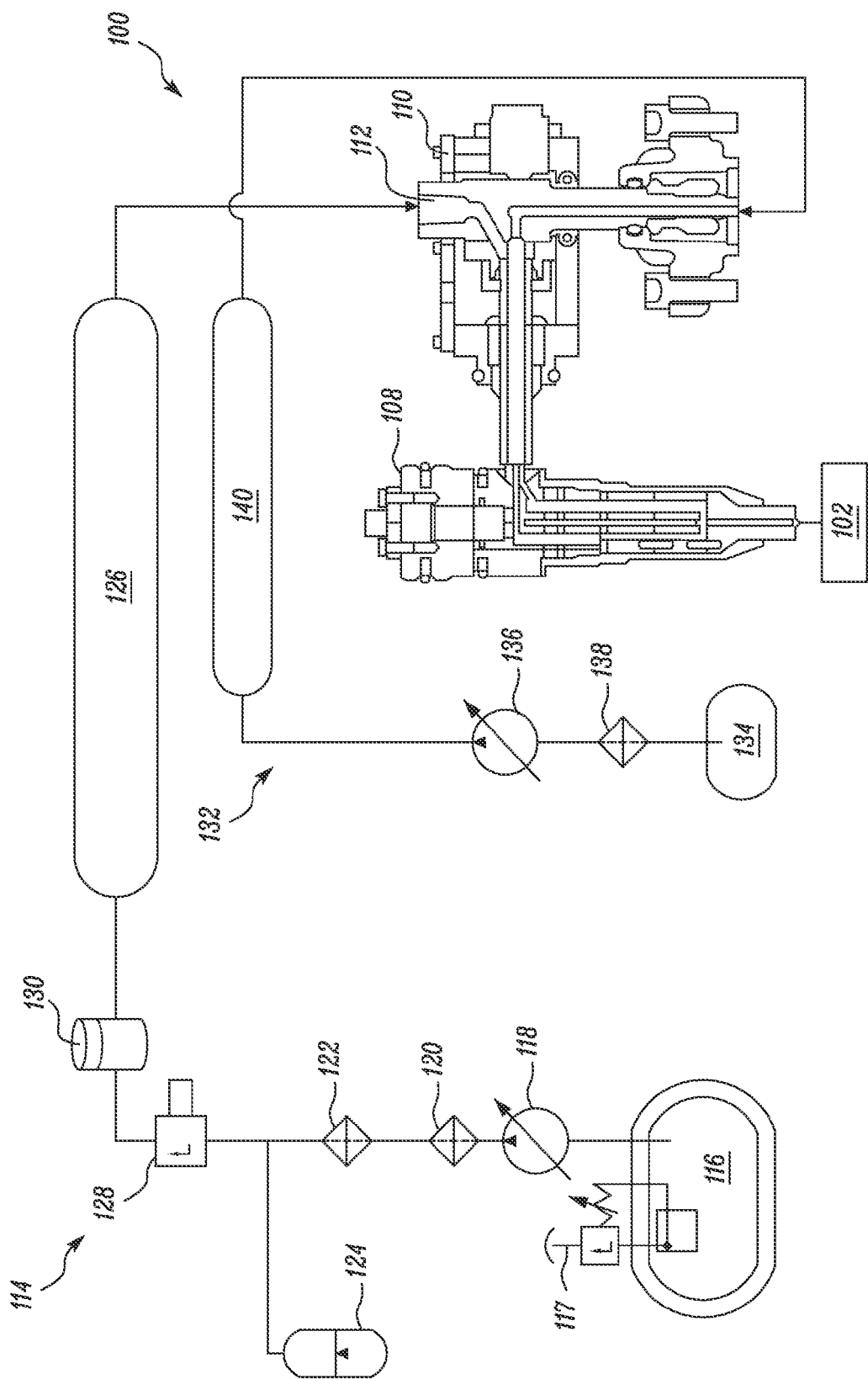
FIG. 1 is a schematic view of an exemplary engine system, according to one embodiment of the present disclosure.

Wherever possible, the same reference numbers will be used throughout the drawings to refer to the same or the like parts. FIG. 1 is a schematic view of a portion of an engine system 100. The engine system 100 includes an engine 102. As shown in the accompanying figures, the engine 102 includes an engine block (not shown) that defines a plurality of cylinders (not shown).

In the illustrated embodiment, the engine 102 is a multi cylinder IC engine. The engine 102 may be powered by any one or a combination of known liquid or gaseous fuels including, but not limited to, gasoline, diesel, natural gas, petroleum gas, and bio-fuels. In the illustrated embodiment, the engine 102 is powered by the combination of liquid and gaseous fuels. The amount of gaseous fuel being supplied to the cylinders may be over 90%, and less than 10% of the fuel may be liquid fuel. Although individual gases, such as, methane, propane, and so on are within the scope of the present disclosure, natural gas containing a mixture of gas species is particularly applicable to the present disclosure. In addition, the liquid fuel is chosen for the ability of compression ignition at the compression ratio of the engine 102. For instance, the liquid fuel may be distillate diesel fuel or some other liquid fuel that is suitable for compression ignition to in turn ignite a charge of gaseous fuel in one of the cylinders.

Further, the engine system 100 may include a plurality of fuel injectors 108. For clarity purposes, only one injector 108 is shown herein. The injector 108 is positioned for direct injection of gaseous fuel and/or liquid fuel into one of the cylinders. The engine system 100 also includes a manifold 110. The manifold 110 includes a plurality tubes extending between an inlet port 112 and the injector 108. The engine system 100 may further include a controller (not shown). The controller may be communicably coupled with the injector 108, in order to selectively control the timing and quantity of both gaseous and liquid fuel injection events.

The engine system 100 includes a gaseous fuel delivery module 114. In the illustrated embodiment, the gaseous fuel is maintained in a liquid state in a cryogenic liquefied natural gas tank 116 of the gaseous fuel delivery module 114. The gaseous fuel delivery module 114 also includes a pump 118. The pump 118 may be a variable displacement cryogenic pump. The pump 118 may be communicably coupled to the controller, and may be controlled in order to pump the gaseous fuel from the tank 116. A pressure regulator 117 may be associated with the tank 116, in order to maintain a pressure build-up in the tank 116. The gaseous fuel delivery module 114 may also include an in-line filter 120 positioned downstream of the pump 118, with respect to a gaseous fuel flow direction. The gaseous fuel pumped by the pump 118 flows through the in-line filter 120 and a heat exchanger 122 of the gaseous fuel delivery module 114. While flowing through the heat exchanger 122, the gaseous fuel expands into a gas, and is maintained within an accumulator 124 of the gaseous fuel delivery module 114.

The gaseous fuel delivery module 114 also includes a gaseous fuel common rail 126. An upstream side of the gaseous fuel common rail 126 fluidly communicates with the accumulator 124, via a gas pressure control valve 128.

The gas pressure control valve 128 may be communicably coupled to the controller. In an exemplary embodiment, the gas pressure control valve 128 may be embodied as an electronically controlled valve that supplies a controlled quantity of gaseous fuel from the accumulator 124 to the gaseous fuel common rail 126. Further, a downstream side of the gaseous fuel common rail 126 is fluidly connected to the injector 108 through one of the inlet ports 112 of the manifold 110.

The gaseous fuel within the tank 116 may sometimes include particulate contaminants therein. These particulate contaminants may be small flecks of metallic or non-metallic debris that become entrained in the gaseous fuel during a gas filling process or may be present within the tank 116 itself. A particulate separator 130 is provided in the gaseous fuel delivery module 114. The particulate separator 130 is configured to separate out the particulate contaminants which may be present in the gaseous fuel. In the illustrated embodiment, the particulate separator 130 is provided between the gas pressure control valve 128 and the gaseous fuel common rail 126. In another embodiment, the particulate separator 130 may be provided between the gaseous fuel common rail 126 and the manifold 110. The particulate separator 130 will be described in detail with reference to FIGS. 2-4, later in this section.

As shown in the accompanying figures, the engine system 100 also includes a liquid fuel delivery module 132. Further, the liquid fuel delivery module 132 includes a liquid fuel tank 134. The tank 134 is configured to hold the source of liquid fuel therein. The liquid fuel delivery module 132 further includes a pump 136 provided in fluid communication with the tank 134. The pump 136 is configured to receive the liquid fuel from the tank 134, via a fuel filter 138, and further deliver the liquid fuel to a liquid fuel common rail 140. The pump 136 may be communicably coupled to the controller, such that an output of the pump 136 may be controlled to maintain a desired pressure within the liquid fuel common rail 140. In another example, the liquid fuel delivery module 132 may include a fixed displacement pump and a pressure control valve in order to return a quantity of the liquid fuel from the liquid fuel common rail 140 back to the tank 134 for controlling a pressure in the liquid fuel common rail 140. A downstream side of the liquid fuel common rail 140 is fluidly connected to the manifold 110 via one of the inlet ports 112, and to the injector 108 by the plurality of tubes.

Figure 2:
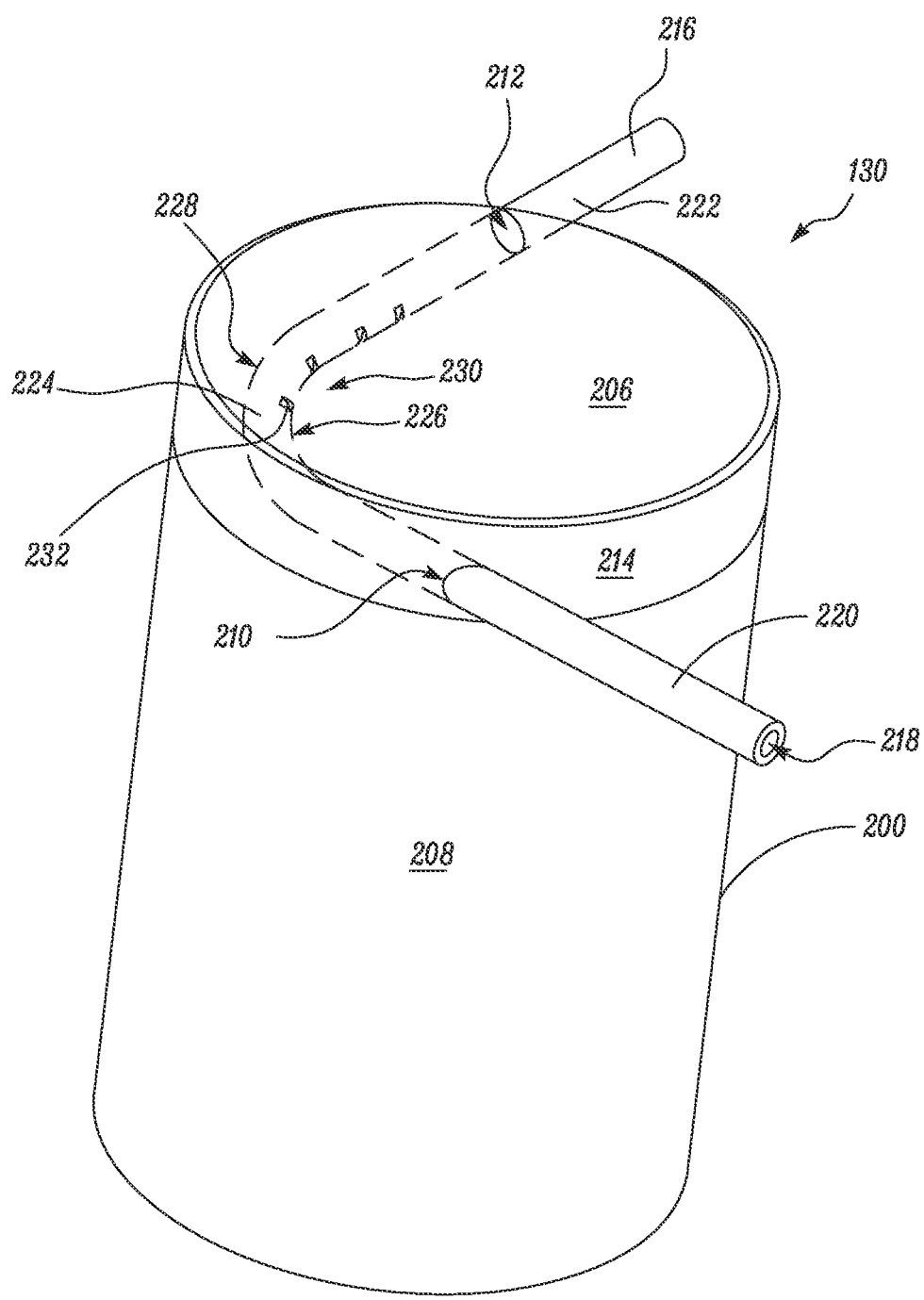
FIG. 2 is a perspective view of an exemplary embodiment of a particulate separator, according to the present disclosure.
Figure 3:
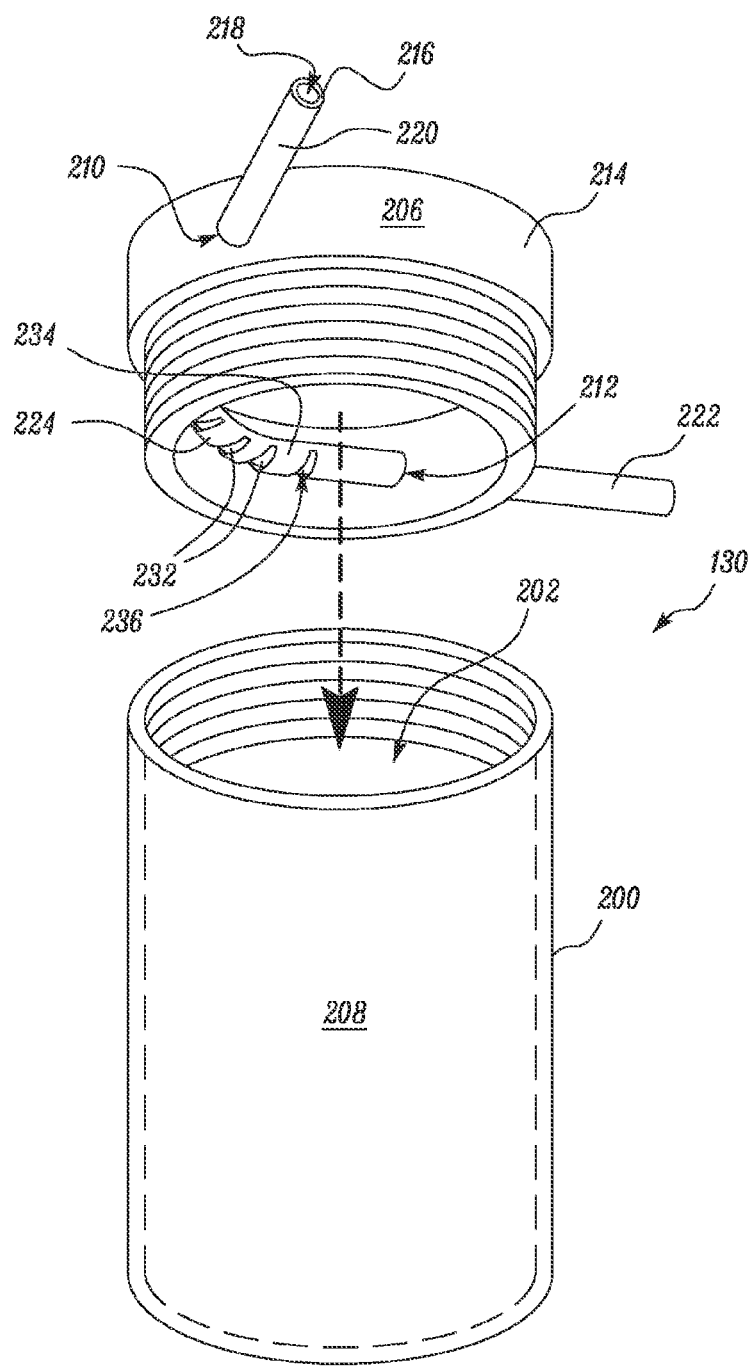
FIG. 3 is an exploded view of the particulate separator of FIG. 2.
Figure 4:
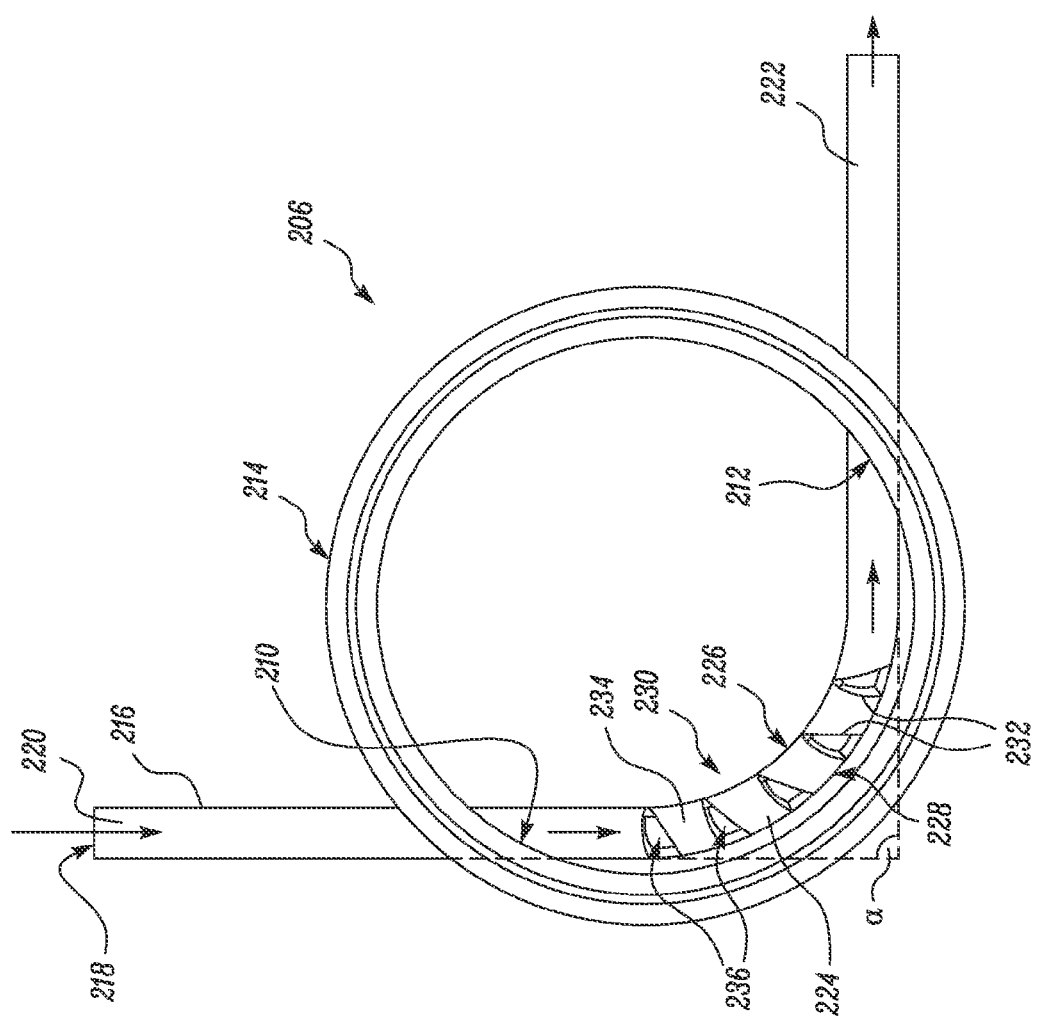
FIG. 4 is a bottom view of a cap member and a conduit of the particulate separator of FIGS. 2 and 3.

The particulate separator 130 will now be explained in detail. Referring to FIGS. 2, 3, and 4, the particulate separator 130 includes a high pressure, sealable collection container 200 defining a collection volume 202 (see FIG. 3) therein. The sealable collection container 200 of the illustrated embodiment has a cylindrical design. Alternatively, the shape of the sealable collection container 200 may be rectangular, or square, without limiting the scope of the present disclosure. The sealable collection container 200 may be made of any suitable metal or polymer known in the art.

The particulate separator 130 includes a two piece design, having a cap member 206 and a base chamber 208. The base chamber 208 is embodied as an open top, closed bottom container within which the collection volume 202 of the particulate separator 130 is defined. Further, the cap member 206 may be threadably coupled to the base chamber 208. For this purpose, the cap member 206 and the base chamber 208 may include corresponding threads provided thereon. Alternatively, any other known releasable mechanical fastening means, for example, bolts, latches, etc. (not shown) may also be used to couple the cap member 206 with the base chamber 208, in order to form the sealable collection container 200. The cap member 206 of the particulate separator 130 includes a pair of apertures, namely a first aperture 210 and a second aperture 212. The first and second apertures 210, 212 are provided within a wall 214 of the cap member 206. In one example, the first and second apertures 210, 212 may be located diametrically opposite to each other.

As shown in the accompanying figures, the particulate separator 130 includes a gaseous fluid conduit or a gaseous fuel conduit, hereinafter referred to as conduit 216. In the illustrated embodiment, the conduit 216 defines an inner channel 218 for a passage of the gaseous fuel therethrough. The conduit 216 may embody a tube or a pipe having a hollow configuration. The conduit 216 may be made of a metal, for example, steel or a stainless steel. In the illustrated embodiment, the conduit 216 is coupled with the cap member 206 of the particulate separator 130. During assembly, the conduit 216 is passed through the first and second apertures 210, 212 of the cap member 206 respectively, so that the conduit 216 creates a seal with the wall 214. The conduit 216 is positioned along an inner periphery of the cap member 206. In an alternate embodiment, the conduit 216 may be provided in the base chamber 208 of the sealable collection container 200.

The conduit 216 includes an inlet segment 220 and an outlet segment 222. The inlet segment 220 of the conduit 216 may be connected to the gas pressure control valve 128 and the outlet segment 222 of the conduit 216 may be connected to the gaseous fuel common rail 126 (see FIG. 1). The conduit 216 also includes an arcuate segment 224 defined between the inlet segment 220 and the outlet segment 222. The arcuate segment 224 has an inner periphery 226 and an outer periphery 228. The arcuate segment 224 is provided, such that, the arcuate segment 224 defines a bend 230. The bend 230 makes an angle α of approximately 90 degrees between the inlet segment 220 and the outlet segment 222 (see FIG. 4). It should be noted that the angle α made by the bend 230 of the arcuate segment 224 may include in a range approximately between 85 to 100 degrees. The angle α of the bend 230 of the arcuate segment 224 may vary for different applications.

The arcuate segment 224 of the conduit 216 includes a plurality of slits 232 formed therein. A wall segment 234 in a portion of the arcuate segment 224 of the conduit 216 defining the slits 232 may have a thickness, such that the thickness of the wall segment 234 decreases in a direction of a flow of the gaseous fuel thereover. The direction of flow of the gaseous fuel is shown using arrows in FIG. 4.

Further, each of the plurality of slits 232 define an opening 236 (see FIGS. 2 and 3). The slits 232 are configured to provide fluid communication between the inner channel 218 of the conduit 216 and the collection volume 202 of the sealable collection container 200. In the illustrated embodiment, the slits 232 are provided at a bottom portion of the arcuate segment 224. Further, the slits 232 may be provided along the outer periphery 228 of the arcuate segment 224.

As shown in the accompanying figures, the slits 232 may have a triangular shape. More particularly, the slits 232 may be provided such that the openings 236 of the slits 232 has a larger dimension at the outer periphery 228 of the arcuate segment 224 and has a smaller dimension at the inner periphery 226 of the arcuate segment 224. It should be noted that the shape and dimensions of the slits 232 does not limit the scope of the present disclosure, and may vary according to a particular application. Accordingly, the slits 232 may have any of a circular, elliptical, trapezoidal, or rectangular shape.

INDUSTRIAL APPLICABILITY

As described above, the gaseous fuel present in the gaseous fuel tank of the gaseous fuel delivery module may contain debris or particulate contaminants therein. Unless otherwise prevented from contacting various components positioned downstream of the gaseous fuel tank, this debris may damage the components of the gaseous fuel delivery module and prevent or degrade an operation thereof The damage of the components may also affect the quantity of the gaseous fuel supply to the injector of the engine system. This may affect an overall performance of the engine system. Further, the components of the engine system may need to be replaced in a situation wherein irreparable damage is caused by the debris.

The present disclosure describes the use of the particulate separator 130 for filtering the gaseous fuel received from the tank 116 of the gaseous fuel delivery module 114. The working of the system will now be explained with reference to FIGS. 1-4.

The gaseous fuel is introduced within the conduit 216 of the particulate separator 130 through the inlet segment 220. On exiting the inlet segment 220, the gaseous fuel flowing through the conduit 216 is deflected from its path, and enters the arcuate segment 224 of the conduit 216. The bend 230 of the arcuate segment 224 is configured to provide a rotational motion to the gaseous fuel flowing through the conduit 216. This rotational motion may cause a centrifugal force to act on the gaseous fuel and also the particulate contaminants which may be present in the gaseous fuel flow entering into the particulate separator 130 via the inlet segment 220. The particulate contaminants may collide with the wall segment 234 forming the bend 230 in the arcuate segment 224. The particulate contaminants, which are generally heavier compared to the gaseous fuel, may be separated out from the gaseous fuel due to the centrifugal force. These separated particulate contaminants may further fall into the collection volume 202 of the sealable collection container 200 through the openings 236 of the plurality of slits 232 formed in the arcuate segment 224.

The gaseous fuel from which the particulate contaminants are separated out exits the conduit 216 of the particulate separator 130 through the outlet segment 222. The gaseous fuel may then flow into the gaseous fuel common rail 126 and further be introduced within the injector 108, via the manifold 110. The injector 108 may atomize the received liquid and gaseous fuels into a fine spray, and introduce the fuels within the cylinders of the engine 102 for combustion purposes. Further, the sealable collection container 200 of the particulate separator 130 may be disassembled from the engine system 100 as required in order to remove the accumulated particulate contaminants therewithin Accordingly, the particulate separator 130 may contain or collect the particulate contaminants and/or debris therewithin, and thereby minimize or prevent damage to the components of the engine system 100 present downstream of the tank 116. This may lead to a reduction in an overall cost and downtime associated with the operation of the engine system 100. Further, the particulate separator 130 of the present disclosure may be easily installed and removed from the engine system 100. During a non-operational state of the engine system 100, the particulate separator 130 may be removed, in order to remove the particulate contaminants accumulated within the collection volume 202 and/or to clean the particulate separator 130, and may be reassembled later.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A particulate separator for a gaseous fluid, the particulate separator comprising:
 a sealable collection container defining a collection volume therein, the sealable collection container including
  a cap member composing a top portion of the sealable collection container, and
  a base chamber coupled to the cap member, a direction from the cap member toward the base chamber defining a downward direction of the particulate separator; and
 a gaseous fluid conduit disposed through the cap member, a wall of the gaseous fluid conduit defining an inner channel therein, the gaseous fluid conduit comprising an inlet, an outlet, and an arcuate segment disposed fluidly in series between the inlet and the outlet,
 the wall of the arcuate segment defining a plurality of slits formed therethrough, the plurality of slits providing fluid communication between the collection volume and the inner channel, the plurality of slits at least partly facing the downward direction, wherein an outward radial direction of the arcuate segment is defined by a direction extending from a center of a radius of curvature of the arcuate segment toward the arcuate segment, and wherein the plurality of slits are provided along an outer periphery of the arcuate segment, such that the plurality of slits at least partly face the outward radial direction.

2. The particulate separator of claim 1, wherein the arcuate segment defines a bend of 90 degrees between the inlet and the outlet.

3. The particulate separator of claim 1, wherein the wall of the gaseous fluid conduit has a thickness along a portion of the gaseous fluid conduit defining each slit of the plurality of slits, and
wherein the thickness decreases in a flow direction through the gaseous fluid conduit that extends from the inlet toward the outlet.

4. The particulate separator of claim 1, wherein each slit of the plurality of slits has at least one of a circular shape and a rectangular shape.

5. The particulate separator of claim 1, wherein at least a portion of the inlet and the outlet is attached to a wall of the cap member.

6. The particulate separator of claim 1, wherein the gaseous fluid conduit is a tube.

7. The particulate separator of claim 1, wherein each slit of the plurality of slits has a triangular shape.

8. The particulate separator of claim 7, wherein each slit of the plurality of slits extends circumferentially about the arcuate segment from an inner periphery of the arcuate segment to an outer periphery of the arcuate segment,
an axial dimension of each slit, along an axial direction, at the outer periphery is larger than an axial dimension of each slit, along the axial direction, at the inner periphery, and
the axial direction extends along a flow direction through the gaseous fuel conduit from the inlet toward the outlet.

9. A gaseous fuel system comprising:
a gaseous fuel source;
a gaseous fuel rail; and
a particulate separator in fluid communication with the gaseous fuel source and the gaseous fuel rail, the particulate separator comprising
a sealable collection container defining a collection volume therein, the sealable collection container including
a cap member composing a top portion of the sealable collection container, and
a base chamber coupled to the cap member, a direction from the cap member toward the base chamber defining a downward direction of the particulate separator; and
a gaseous fuel conduit disposed through the cap member, a wall of the gaseous fuel conduit defining an inner channel therein, the gaseous fuel conduit comprising an inlet, an outlet, and an arcuate segment disposed fluidly in series between the inlet and the outlet,
the wall of the arcuate segment defining a plurality of slits formed therethrough, the plurality of slits providing fluid communication between the collection volume and the inner channel, the plurality of slits at least partly facing the downward direction, wherein an outward radial direction of the arcuate segment is defined by a direction extending from a center of a radius of curvature of the arcuate segment toward the arcuate segment, and wherein the plurality of slits are provided along an outer periphery of the arcuate segment, such that the plurality of slits at least partly face the outward radial direction.

10. The gaseous fuel system of claim 9, wherein the arcuate segment defines a bend of 90 degrees between the inlet and the outlet.

11. The gaseous fuel system of claim 9, wherein the wall of the gaseous fuel conduit has a thickness along a portion of the gaseous fuel conduit defining each slit of the plurality of slits, and
wherein the thickness decreases in a flow direction through the gaseous fluid conduit that extends from the inlet toward the outlet.

12. The gaseous fuel system of claim 9, wherein each slit of the plurality of slits has at least one of a circular shape and a rectangular shape.

13. The gaseous fuel system of claim 9, wherein each slit of the plurality of slits has a triangular shape.

14. The gaseous fuel system of claim 13, wherein each slit of the plurality of slits extends circumferentially about the arcuate segment from an inner periphery of the arcuate segment to an outer periphery of the arcuate segment,
an axial dimension of each slit, along an axial direction, at the outer periphery is larger than an axial dimension of each slit, along the axial direction, at the inner periphery, and
the axial direction extends along a flow direction through the gaseous fuel conduit from the inlet toward the outlet.

15. An engine system comprising:
a fuel injector;
a gaseous fuel source;
a gaseous fuel rail; and
a particulate separator in fluid communication with the gaseous fuel source and the gaseous fuel rail, the particulate separator comprising
a sealable collection container defining a collection volume therein, the sealable collection container including
a cap member composing a top portion of the sealable collection container, and
a base chamber coupled to the cap member, a direction from the cap member toward the base chamber defining a downward direction of the particulate separator; and
a gaseous fuel conduit disposed through the cap member, a wall of the gaseous fuel conduit defining an inner channel therein, the gaseous fuel conduit comprising an inlet, an outlet, and an arcuate segment disposed fluidly in series between the inlet and the outlet,
the wall of the arcuate segment defining a plurality of slits formed therethrough, the plurality of slits providing fluid communication between the collection volume and the inner channel, the plurality of slits at least partly facing the downward direction, wherein an outward radial direction of the arcuate segment is defined by a direction extending from a center of a radius of curvature of the arcuate segment toward the arcuate segment, and wherein the plurality of slits are provided along an outer periphery of the arcuate segment, such that the plurality of slits at least partly face the outward radial direction.

* * * * *